Feb. 20, 1951  C. H. MOLLER  2,542,155
SCREEN FOR EAVE TROUGHS
Filed Nov. 1, 1948
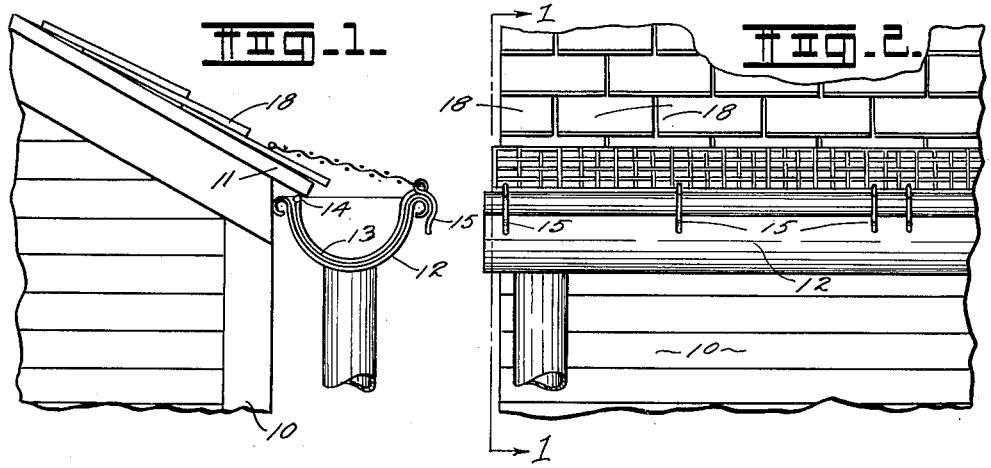
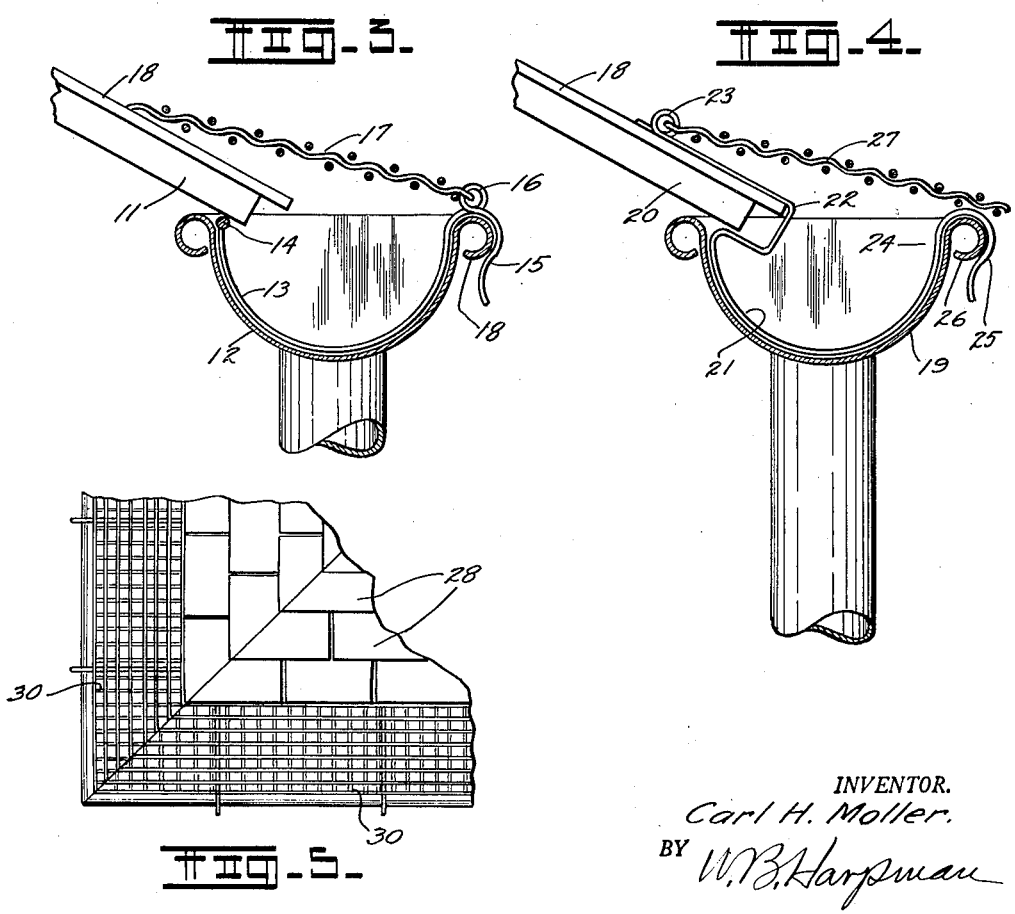
INVENTOR.
Carl H. Moller.
BY W. B. Harpman
ATTORNEY.

Patented Feb. 20, 1951

2,542,155

UNITED STATES PATENT OFFICE 2,542,155

SCREEN FOR EAVE TROUGHS

Carl Hilding Moller, Youngstown, Ohio

Application November 1, 1948, Serial No. 57,790

3 Claims. (Cl. 108—30)

This invention relates to screens and more particularly to screen sections for application to eave troughs.

The principal object of the invention is the provision of a screen unit for application to an eave trough.

A further object of the invention is the provision of a screen section and means for mounting the same on an eave trough.

A still further object of the invention is the provision of a screen unit and means engageable with the eave and eave trough for securing the screen unit in place.

A still further object of the invention is the provision of an inexpensive easily applied screen unit for eave troughs which will serve to keep leaves and the like out of the eave trough.

The screen for eave troughs shown and described herein comprises a simple and inexpensive assembly of a section of screen and a plurality of wire-like frame members. The wire-like frame members are adapted for registry with the eave trough and the edge of the eaves under which the eave trough is located and the section of screen is secured to the wire-like frame members in hinged relation so that the screen for eave troughs may be applied in convenient sections to an eave trough by merely placing the sections in appropriate position. The screen for eave troughs is intended for application to various forms of eave troughs both metal and wooden and those hung beneath the edge of the eaves as well as those fastened directly to the eaves and forming a part of the construction thereof. The screen prevents the accumulation of leaves and other debris in the eave troughs and therefore eliminates the necessity of frequent cleaning out of the same.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is an end view of a portion of a building showing an eave spout in cross sectional elevation and the screen for eave troughs applied thereto.

Figure 2 is a front view of the building and eave trough and screen shown in Figure 1. Line 1—1 on Figure 2 indicates the section on Figure 1.

Figure 3 is an enlarged cross section of the eave trough and screen unit.

Figure 4 is an enlarged section of an eave trough and showing a modified form of screen unit.

Figure 5 is a top view of an outside corner of an eave trough and roof section showing the application of the screen for eave troughs thereto.

By referring to the drawings and Figures 1, 2 and 3 in particular it will be seen that the screen for eave troughs in its preferred form is applied to a building such as indicated by the numeral 10 having eaves such as indicated by the numeral 11 and an eave trough 12 by placing therein a preformed group of wire-like frame members 13 secured to one another by a longitudinal member 14 and each of the wire-like frame members 13 having a hook 15 formed on its outermost end adapted for registry over the rolled edge of the eave trough 12. The longitudinal member 14 is adapted to be engaged beneath the overhanging edge of the eave 11 as best shown in Figures 1 and 3 of the drawings and it will be observed that the portions of the several wire-like frame members 13 which form the hooks 15 are bent upwardly to form eyelets 16 which provide means for hingedly mounting elongated sections of wire mesh 17. The sections of wire mesh 17 are wider than the total width of the eave trough 12 so that the innermost edge thereof rests upon the upper surface of the eave 11 and more particularly on the roofing material positioned thereon such as shingles 18. The outermost edge of the wire mesh forms a parallel line with the rolled outermost edge of the eave trough indicated by the numeral 19 and over which edge 19 the hooks 15 are positioned.

It will thus be seen that when sections of the wire mesh 17 of approximately 6 inches in width and 4 feet in length, for example, are provided with a plurality of the wire-like frame members 13 which are secured to one another by the longitudinal member 14, the assembled unit thus formed (as best shown in Figure 2 of the drawings) may be readily applied to a conventional eave trough by simply placing the wire frame members 13 in the eave trough with the longitudinal member registering beneath the eaves 11. The wire mesh 17 will then be appropriately positioned over the eave trough 12 and at an angle from horizontal with its innermost edge resting on the eave so that any leaves or other debris falling on the roof will be prevented from entering the eave trough 12.

Still referring to Figures 1, 2 and 3 of the drawings it will be seen that the sections of wire mesh 17 may be readily opened to provide access to the interior of the eave trough 12 by merely hinging the same as they are carried on the plurality of eyelets 16 formed on the hooks 15 of the frame members 13. Thus the eave trough may be painted or otherwise serviced without the necessity of removing the screen units therefrom.

By referring to Figure 4 of the drawings a modified form of the screen for eave troughs may be seen and wherein an eave trough is indicated by the numeral 20, the eave adjacent thereto by the numeral 21 and a plurality of wire-like frame members 22 are positioned in the eave trough and provided with U-shaped sections 23 registering over the edge of the eave 21 and provided with eyelets 24 on their uppermost innermost ends. The outermost ends of the wire-like members are secured to one another by a longitudinally extending member 25 and have hooks 26 formed thereon for registry over the rolled outer edge 27 of the eave trough 20. A section of wire mesh 28 is hingedly affixed to the eyelets 24 and is thus positioned in reversed relation to the wire mesh section 17 heretofore referred to.

By referring now to Figure 5 of the drawings it will be seen that corners of eave troughs can be readily covered with the screen units by simply cutting the mesh on a 45° angle so as to in effect miter the same which permits them to be installed on outside corners as illustrated or on inside corners as will be obvious to those skilled in the art. In Figure 5 of the drawings the roof sections are indicated by the numeral 29, the eave troughs by the numeral 30 and the screen wire sections by the numeral 31.

It will thus be seen that the screen for eave troughs disclosed herein may be formed in simple, inexpensive units at low cost and that the same may be easily applied to eave trough constructions with a minimum of installation effort to the end that leaves and debris are prevented from entering the eave troughs thus protected.

Having thus described my invention, what I claim is:

1. A screen for eave troughs comprising a rectangular section of screen wire and a frame, the said frame including several spaced arcuate members for transverse registry within said eave trough and a longitudinal member secured thereto at their innermost ends, one edge of the said screen wire hingedly affixed to the arcuate members adjacent their outermost ends, said arcuate members having outwardly and downwardly turned outermost ends for snap-on registry over the outer edge of said eave trough.

2. A screen for eave troughs comprising a rectangular section of screen wire and a wire-like frame, the said wire-like frame including several spaced arcuate members resting transversely within said eave trough and a longitudinal member secured thereto at their innermost ends, one edge of the said screen wire hingedly affixed to the arcuate members at their outermost ends, the said longitudinal member engageable beneath the eave from which the eave trough is suspended to hold the said arcuate members within the said eave trough and the screen wire thereover.

3. A screen for eave troughs comprising a section of screen wire and a frame, the said frame including several arcuate members and a longitudinal member secured at right angles thereto at their innermost ends, the said screen wire hingedly affixed to the arcuate members adjacent their outermost ends, outturned and downwardly extending hooks formed on the outermost ends of the said arcuate members for snap-on registry over the edge of the said eave trough.

CARL HILDING MOLLER.

REFERENCES CITED

The following references are of record in the file of this patent:

UNITED STATES PATENTS

| Number | Name | Date |
| --- | --- | --- |
| 550,173 | Hitt | Nov. 19, 1895 |